Sept. 25, 1934.  E. F. GALLAUDET  1,974,453
PROCESS AND APPARATUS FOR MAKING FILLED AND COATED CORDS
Filed March 15, 1930  6 Sheets-Sheet 1
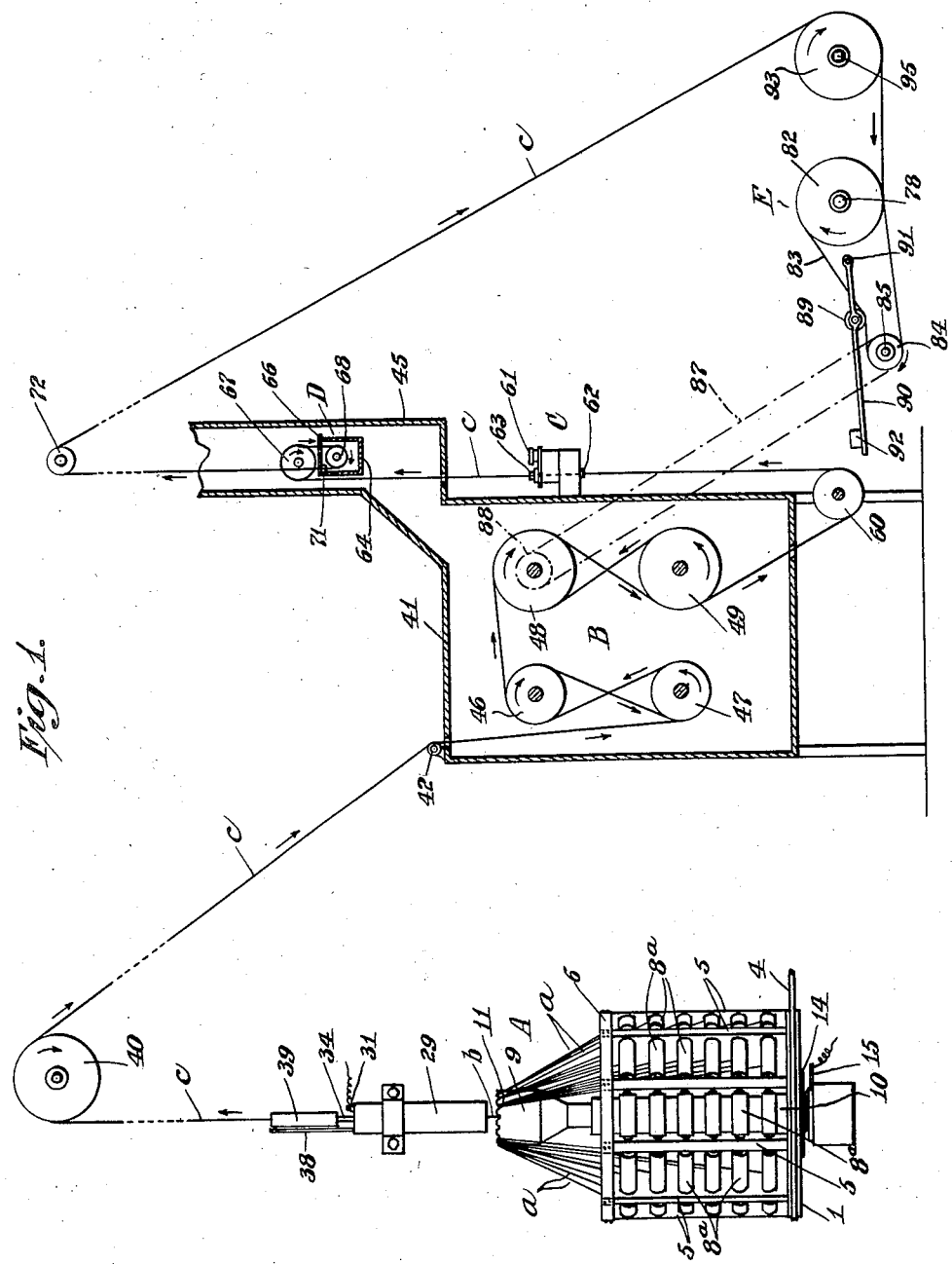

Sept. 25, 1934.  E. F. GALLAUDET  1,974,453
PROCESS AND APPARATUS FOR MAKING FILLED AND COATED CORDS
Filed March 15, 1930  6 Sheets-Sheet 2
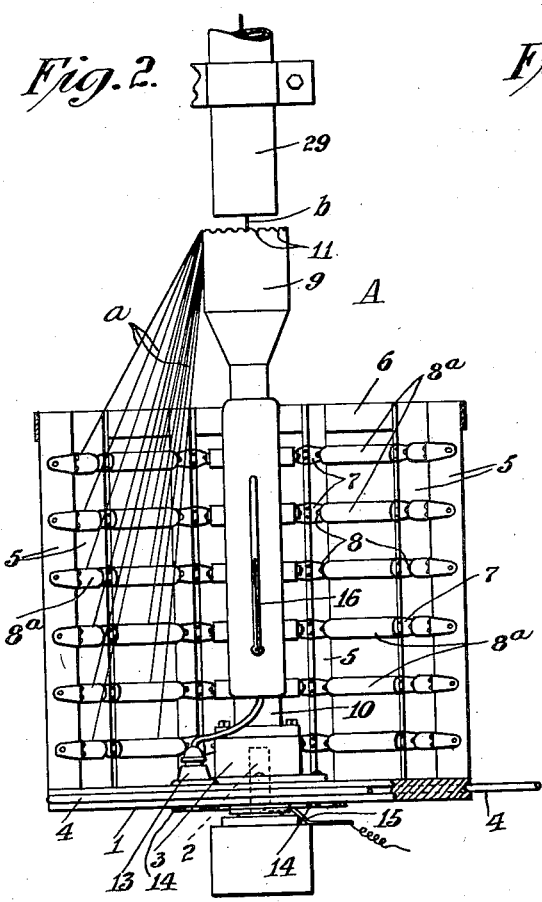
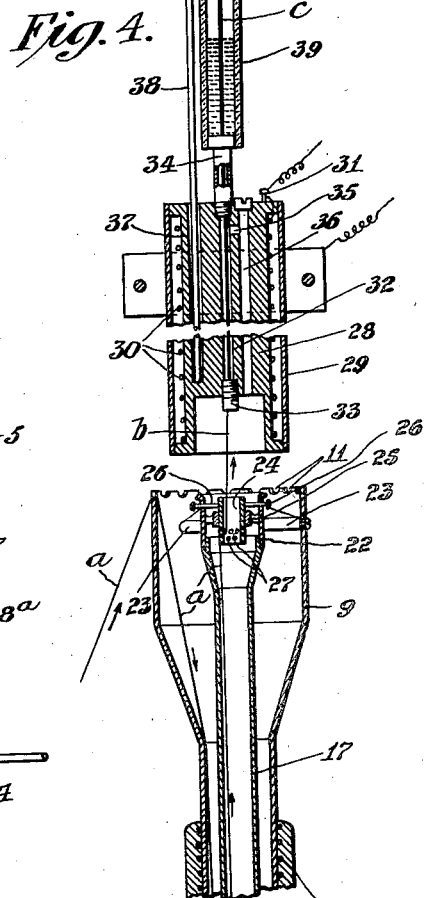
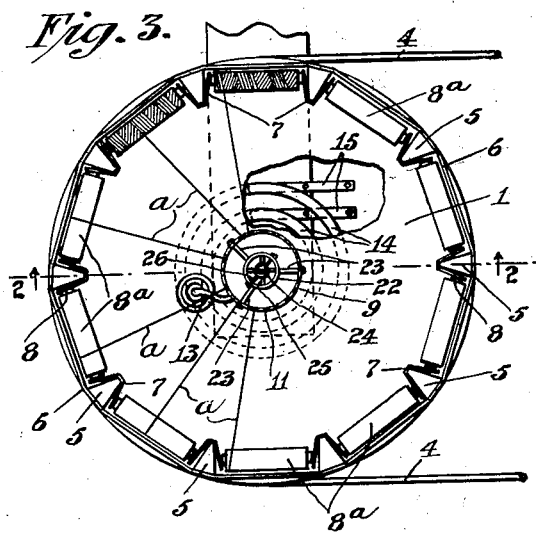
Edson F. Gallaudet
INVENTOR
BY Wm. B. Whitney
ATTORNEY

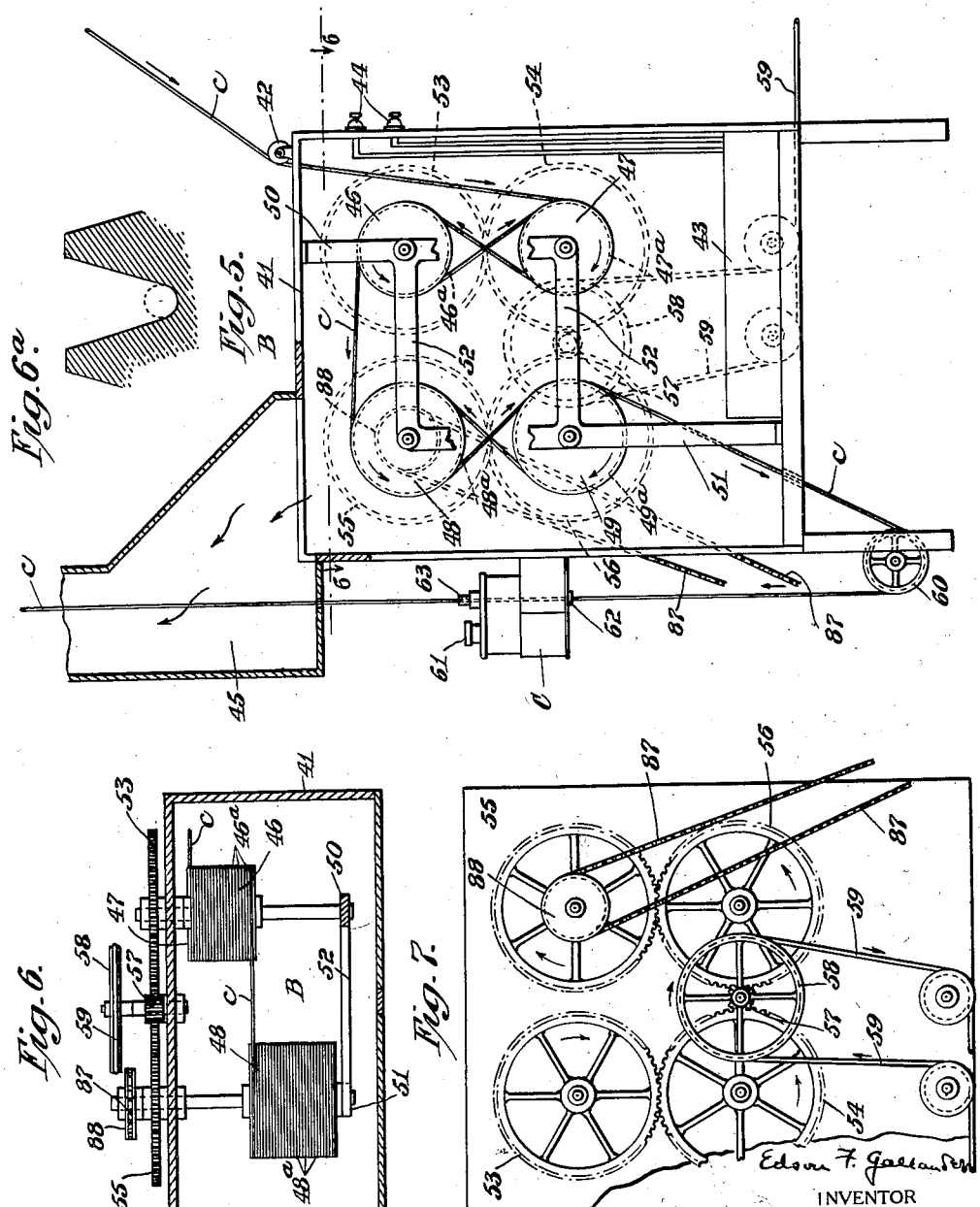

Sept. 25, 1934. E. F. GALLAUDET 1,974,453
PROCESS AND APPARATUS FOR MAKING FILLED AND COATED CORDS
Filed March 15, 1930 6 Sheets-Sheet 4
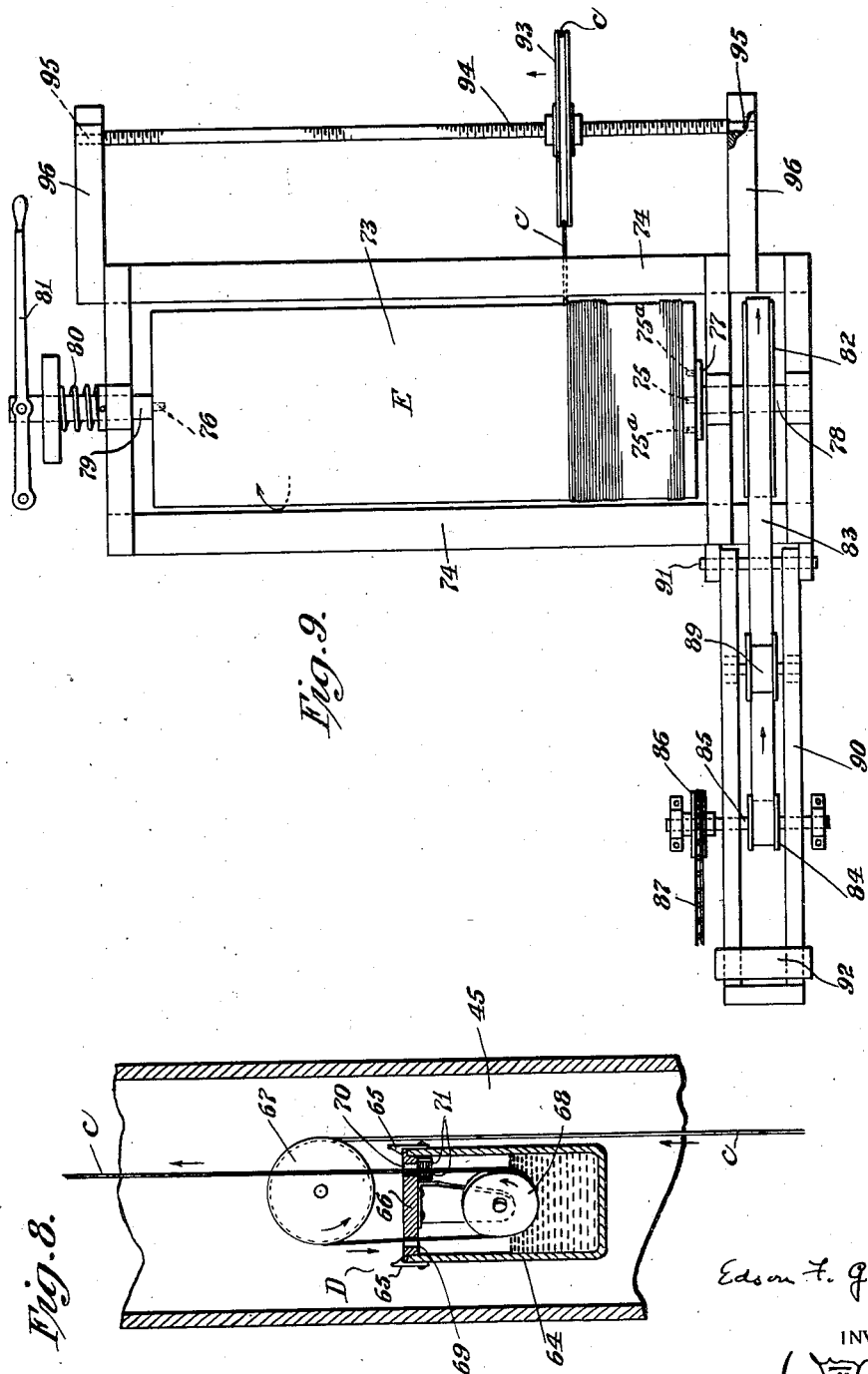

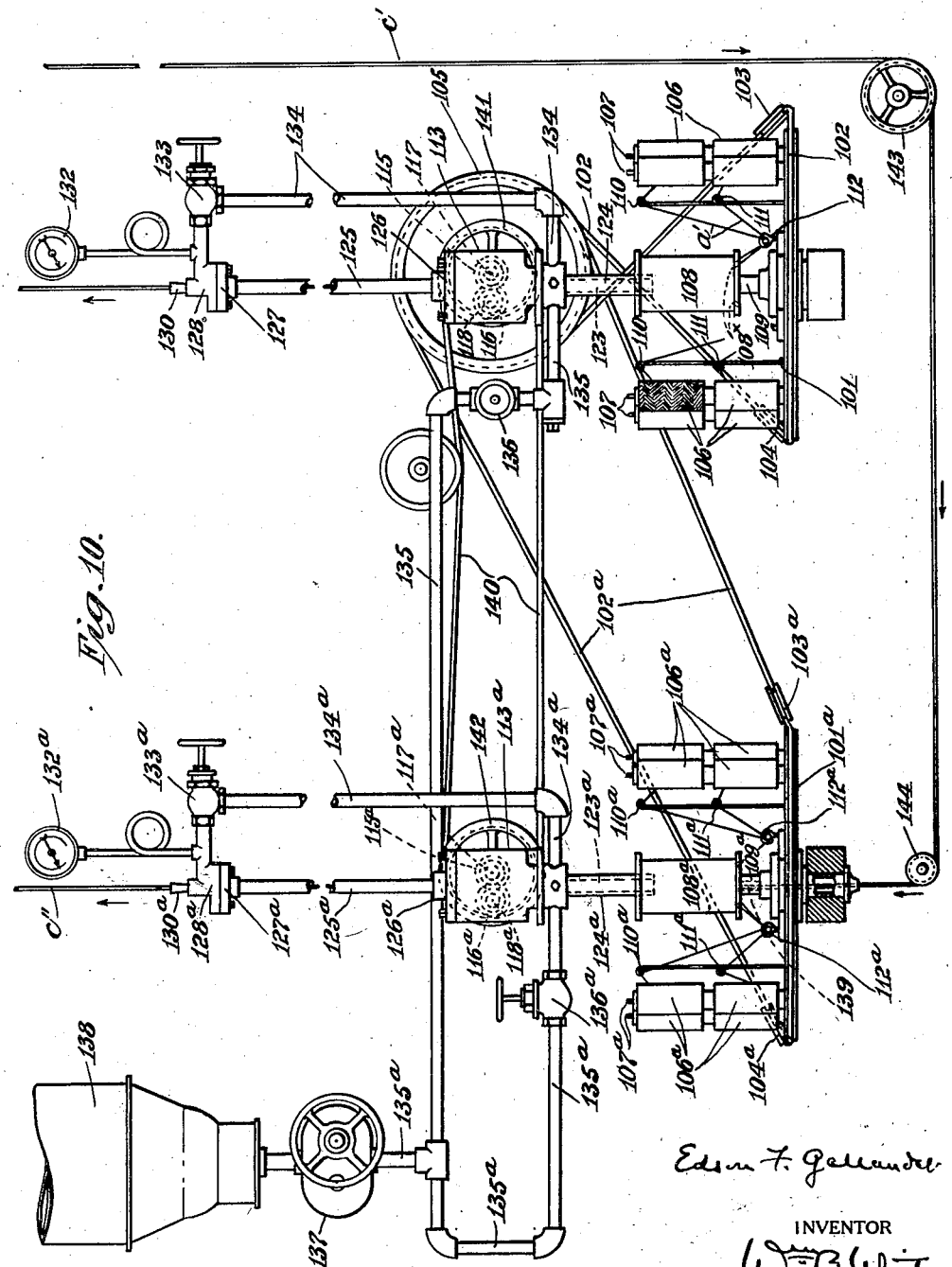

Sept. 25, 1934.   E. F. GALLAUDET   1,974,453
PROCESS AND APPARATUS FOR MAKING FILLED AND COATED CORDS
Filed March 15, 1930   6 Sheets-Sheet 6
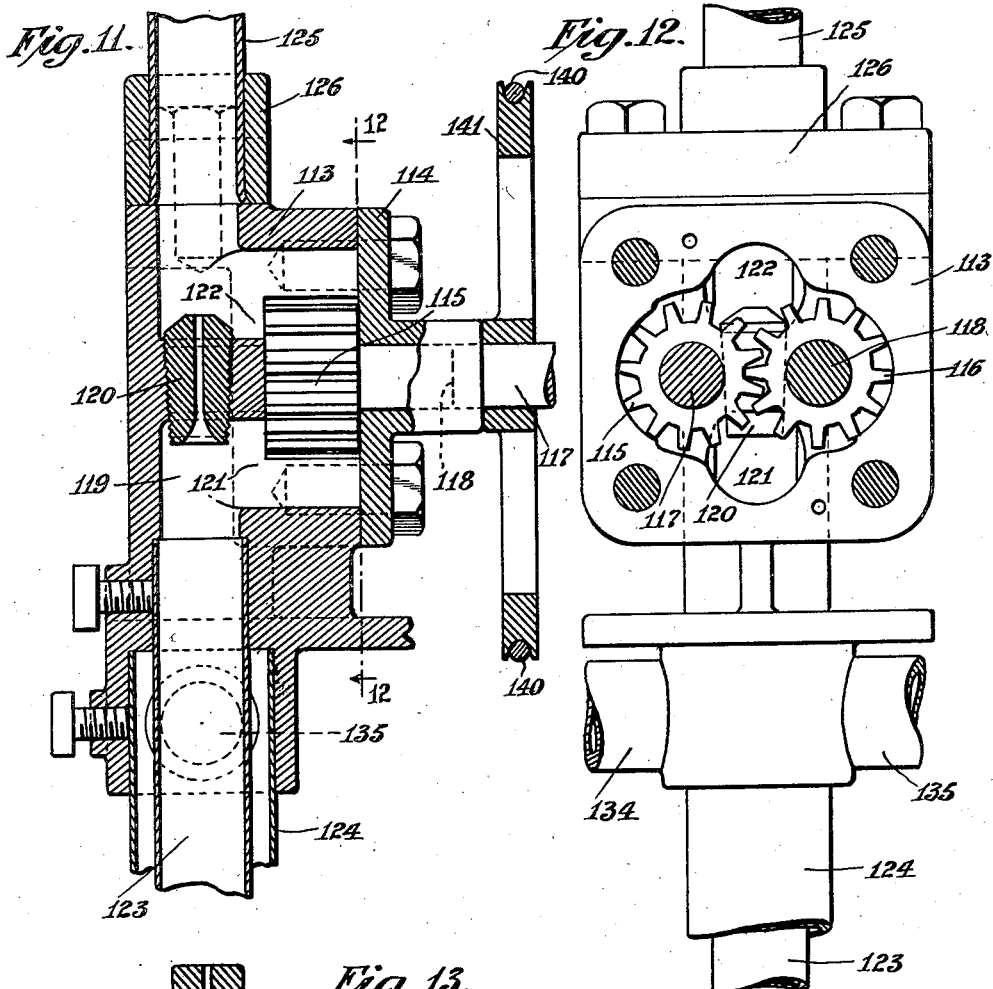
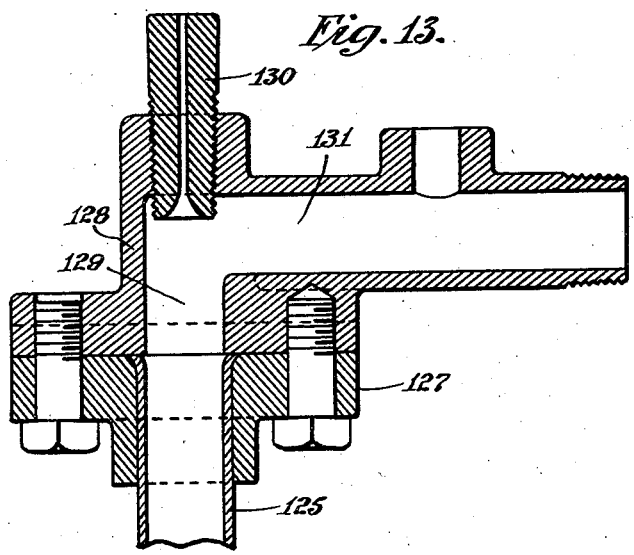
Edson F. Gallaudet
INVENTOR
BY Wm B. Whitney
ATTORNEY Patented Sept. 25, 1934

1,974,453

UNITED STATES PATENT OFFICE 1,974,453

PROCESS AND APPARATUS FOR MAKING FILLED AND COATED CORDS

Edson F. Gallaudet, East Greenwich, R. I.

Application March 15, 1930, Serial No. 436,172

20 Claims. (Cl. 117—2)

The invention relates to cords which are made of fibrous material, preferably silk or fibers having similar properties, and primarily intended for use as a substitute for gut in the stringing of tennis rackets and the like, although well adapted for many other uses.

In an earlier Patent, No. 1,460,665, issued to me under date of July 3, 1923, there is disclosed and claimed a method of preparing cords for the purpose in view, in which a previously fabricated twisted or braided cord of silk or some similar fiber is stretched, preferably after being wet and while drying, to thoroughly remove the looseness of the particles of its fibers and is then strung in the racket or kept under tension sufficient to prevent any substantial loosening of the particles and while under tension, either before or after being strung, is treated with a waterproofing composition, such as spar varnish, which will permeate and coat the cord, dry hard and tight, and not disintegrate.

The object of my present invention, which to a certain extent is in the nature of an extension of and improvement upon that of my said prior patent, is the production of a cord, of a similar character and equal excellence but of better wearing quality, in a quicker, more efficient, and hence cheaper manner.

To this end the invention embraces both a process, of three to five steps, and apparatus by means of which the several steps of the process can be carried out not only successively but continuously and without any intermediate handling.

I here start with the making of the cord, preferably a twisted cord, by twisting together a number of the threads of silk or other fiber of which the cord is composed; and I have found that by applying the filling and coating composition or dope to the threads before and as they are being twisted it will permeate and soften the fibers of the threads and fill and coat the body of the cord, and, further, that by suitably stretching and manipulating the cord while the dope is still soft and pliable and while the fibers of the threads are thus softened, I am able to remove the apparent looseness of their particles without resorting to the preliminary stretching described in my said earlier patent.

Accordingly, the first step of my new process consists in passing the silk or other threads which are to constitute the cord in an elongated path through a bath of the dope, twisting them together while still immersed therein, and as the twisted threads emerge therefrom forming them into a smooth cylindrical cord and removing the excess of dope adhering to its surface. And, for the carrying out of this step of the process, I have provided, briefly stated, a rotating table which carries circularly disposed thereon the required number of spools of the threads and mounted axially thereof a pot filled with dope, and immediately above and in axial alignment with the pot, and co-operating with these spinning elements, a stationary former or member equipped with lower and upper nozzles, the threads being drawn from the rotating spools into the rotating pot and in an elongated path through the dope therein and thence in a twisted mass up through the nozzles of the stationary member which form the cord and scrape off the excess of dope adhering thereon. By mounting a part of the spools of thread and another pot of dope upon a second table, with a second stationary former, the doped and twisted cord formed on the first table can be drawn axially up through the second table and the pot of dope thereon and enclosed within a wrapper of doped threads twisted in the opposite direction.

Any dope may be used which is suited for the use for which the cord is designed. For cord for stringing rackets, I now prefer a dope to the basic substance of which is added a suitable softening material to prevent the cord being too hard and brittle. For softening materials I have secured good results with glycerine, sulphonated castor oil, or similar non-volatile water-soluble fluid. A most satisfactory solution for the purpose consists of 100 parts dry weight of best gelatin, 25 to 50 parts by weight of the softening material, and 75 to 100 parts of water also by weight. The solution is mixed cold and allowed to stand for about two hours. It is then heated in a double boiler and kept at a temperature of about 150° F. until all lumps have disappeared. The dope has to be applied hot, and therefore I equip both the rotary pot and the stationary former of the spinning mechanism with heating elements by which the dope can be maintained at the temperature mentioned, namely, about 150° F. while the threads are being twisted and the cord formed. Gelatin, however, is easily affected by water, but may be rendered quite waterproof by treatment with formaldehyde, which cannot be added to the solution in the pot as it would solidify the gelatin and, since it could not be melted or boiled out, would completely clog up the apparatus. Hence, a small cylindrical reservoir containing a strong solution of the formaldehyde is mounted upon the outer end of the upper nozzle of the former, and so by passing the spun cord while still hot and before it has been exposed to the air or dried up through the formaldehyde, the cord is rendered thoroughly waterproof. Another dope which is itself unaffected by moisture and therefore waterproof and which I have used with excellent results consists of a heavy solution of nitro-cellulose softened with some of the plasticizing oils ordinarily used with nitro-cellulose in making lacquers—for example, a solution formed by dissolving 10 parts of nitrated cotton in 15 parts of a quick-drying solvent such as acetone and adding thereto 5 parts of blown linseed oil and 2 parts of blown soya bean oil, all parts being by weight. This dope can be used either hot, in the apparatus and in the manner described, or cold, but because of its thickness and viscosity when cold it will not penetrate the fibers of the threads as completely as desired unless the threads are allowed to remain and soak therein for a time. Accordingly, I preferably provide for use with this dope a stationary former of greater length than that previously mentioned and maintain therein, between its lower and upper nozzles, a column of the dope in which the twisted threads of the cord can soak for the required length of time; and in order to eliminate the heavy drag which would otherwise be set up on the cord by the great viscosity of the dope and would cause its twisted threads to so pull in towards its center as to squeeze the dope out and not leave enough inside the cord to secure the desired cohesion, I equip the forming device with a suitable pump by which dope is pumped up from the revolving pot below and forced up through the stationary former so as to travel upwardly therein, under pressure adjustable by control of the size of the outlet opening to a return pipe, at a speed substantially the same as that at which the cord is being drawn through the former. The twisted cord therefore travels in and with, not through, the dope in the former while the friction of the circulating dope so warms it up as to render it more fluid and thereby to increase its power of penetration.

The second step, that of drying, stretching and kneading the twisted and doped cord, consists in heating the cord and, while it is thus being dried, first stretching it to remove the looseness of the particles of its fiber threads and then, without any relaxation of the stretching tension and as the dope is hardening, gently kneading the cord to compact both the fibers of its threads and the dope, to round out its body into cylindrical form, and to smooth and polish its surface. Special apparatus for performing this operation is provided by two pairs of spaced drums the peripheries of which are provided with a plurality of V-shaped round-bottomed annular grooves and which are either heated internally or, preferably, are mounted within a heated chamber. The two drums of each pair are rotated in opposite directions, the second pair is driven at a peripheral speed sufficiently greater than that of the first pair to provide the tension required, say 30 to 40 pounds, to suitably stretch the fibers of the cord as it passes from one to the other pair of drums, and the cord is carried around the drums of each pair in the direction of their motion and from groove to groove therein and so forms at each full turn a complete figure eight. The cord may be given relatively few turns around the first pair of drums, sufficient to provide without slipping both the pull required to draw the cord from the spinning and forming apparatus and resistance to the forward pull on the cord and to knead the cord to some extent, and is then carried to and given a greater number of turns around the second pair of drums to provide the length and duration of travel required to effect the desired hardening of the dope; and during this travel, while under a maintained tension, the cord is rolled slightly about its longitudinal axis as it successively passes from one groove of the drums to the next and is thereby further kneaded, compacted and polished.

The next step, which is optional and may be omitted, especially when the gelatin dope first above described is used, consists in applying a finish lacquer to the dried and polished cord; and this step can be conveniently performed by carrying the cord under tension from the second pair of kneading and polishing drums through a pot of suitable dope solution, which may be the same as that used in the spinning and forming apparatus, and out therefrom through a nozzle, slightly larger than the diameter of the finished cord, which will allow the cord to pass freely but will scrape back any excess dope which otherwise would adhere thereto, leaving thereon a fairly heavy but uniform and smooth finish coating of lacquer to give it a hard and wear-resisting surface.

Another step, also optional, consists in applying to the cord a coating of a lubricant, as by passing it through a bath of the lubricant in solution and then between soft brushes which will smooth the coating and brush off any excess thereof. A number of different lubricants have been found to give good results, but it is important that neither the lubricant itself nor the carrying solvent be of a character to in any way affect the dope with which the cord is filled and lacquer finished and the solvent should be quite volatile so that it will evaporate rapidly. The best results thus far obtained have been with beeswax dissolved in gasoline to which a small amount of benzol is added, a gasoline mixture which is known under the trade name of "Nugas". The wax is not completely solvent in the gasoline unless the latter is warmed and hence the vessel containing the solution may conveniently be placed in the stack or outlet passage through which the hot air escapes from the top of the drying chamber, the heated air serving to warm the solution sufficiently to keep the wax completely dissolved.

As a final step the cord thus fabricated is reeled up, or otherwise secured, under a tension sufficient to hold it hard and compact, and is so kept until the filling and coating dope has hardened to such an extent that the fibers of the threads will not break away therefrom upon relaxation of the tension. A few days of hardening will be sufficient to give a permanent set to the mass of the cord, which can then either be kept reeled up under tension until it is strung into rackets, which is the preferred practice whenever practicable, or may be removed and wrapped and tied in small coils for shipment without seriously affecting its capability of remaining tight after stringing. Any suitable reeling mechanism may be used. In the practice preferred, however, I use for the reel a wooden cylinder of some forty-five inches in length and of fourteen inches diameter so that ten turns of the cord thereon will give the unit of length in which cord for tennis rackets is usually wrapped up for sale. The reel is removably mounted and detachably coupled to a driving member in any suitable manner, so that when one reel has been filled it may be removed and replaced with another; and it is positioned to receive the cord after leaving the kneading and polishing drums and passing successively through the finish lacquer and lubricating baths, if used, and the cord is guided thereto over a sheave which is mounted upon a threaded rod, paralleling the axis of the reel, to travel thereon from one end of the reel to the other so that the cord will be wrapped about the reel with its successive turns close together but not in touch. The speed at which the drive-member is driven is adjustable in order that the reel may be made to reel up the cord at a speed just sufficient to draw it from the kneading and polishing drums, and through the finish lacquer and lubricating baths if used, under the desired tension.

The invention will be fully understood by reference to the accompanying drawings, in which—

Figure 1 is a view showing in elevation from the back, with parts of the drying chamber in section, and more or less diagrammatically, one practical embodiment of my new apparatus and a cord in process of fabrication therewith; Fig. 2 is a view, partly in section and partly in elevation, of the spinning mechanism, showing the lower end of the stationary former associated therewith; Fig. 3 is a plan view of the spinning mechanism, with a part of the rotary table broken away; Fig. 4 is a view, in vertical section and on an enlarged scale, of the dope pot on the spinning table and of the stationary former; Fig. 5 is a front elevational view of the drying chamber, the front wall of the chamber being removed, showing the ends of the two pairs of drums mounted therein and also showing, in elevation, the pot with the finish lacquer attached to the outer side of one of the walls of the chamber; Fig. 6 is a view, on the section line 6 6 of Fig. 5, showing in plan the upper of the two pairs of drums in the drying chamber; Fig. 6$^a$ is an enlarged section of one of the grooves in the drums, showing the preferred shape of these grooves; Fig. 7 is an elevational view of the back of the drying chamber showing the gears which drive the drums therein; Fig. 8 is a view, corresponding to Fig. 5 but on a larger scale, showing in section the upper portion of the stack or outlet from the drying chamber and the device for applying the lubricating solution mounted therein; Fig. 9 is a plan view of the reeling mechanism shown in Fig. 1; Fig. 10 is a view showing in elevation a modified form of the cord spinning and forming mechanism; Fig. 11 is an enlarged sectional view of the pump section of one of the two stationary formers shown in Fig. 10; Fig. 12 is a view of the pumping mechanism on the line 12 12 of Fig. 11; and Fig. 13 is a correspondingly enlarged sectional view of the upper end of one of the two stationary formers shown in Fig. 10.

Referring first to Fig. 1, A indicates generally the spinning and forming mechanism, B similarly indicates the drying, stretching and kneading apparatus, C indicates the pot or vessel containing the finishing lacquer solution, D indicates the pot or vessel containing the lubricating solution, and E indicates generally the reeling mechanism; and $a\,a$ indicate the individual silk or other threads which are twisted together and, with the filling and coating of dope, make up the body of the cord $c$, here shown in the several successive steps of fabrication.

As shown more fully in Figs. 2–4, the thread-twisting mechanism comprises a circular table 1, preferably about eighteen inches in diameter, which is rotatably mounted upon a vertical axle 2, fixed in a suitable base and stepped into the hub 3 of the wheel, and is driven by a belt 4 passing around a groove in its periphery and another small grooved pulley (not shown) in turn driven by a suitable electric motor, for example. The table carries, circularly disposed near its periphery, a plurality of spaced V-shaped posts 5 5 the upper ends of which are braced and held at even distances apart by a metal ring 6; and to the inner thin edge of each of these uprights are secured a series of V-shaped spring bearing members 7 7, each provided near the outer end of each side with a bearing opening 8. The spools of thread 8$^a$ 8$^a$ are mounted in ranks between the uprights by inserting one axle of a spool in an opening 8 of a member 7 and then pressing back the side of such member and springing the other axle into the opening 8 in the adjoining side of the corresponding member on the adjacent upright.

The table also carries, mounted axially thereon, the cylindrical dope pot 9, approximately eighteen inches in height, which at its lower end is secured within and closed by a flanged bottom 10 bolted to the hub of the table and around the edge of its enlarged funnel-shaped upper end is provided with a series of spaced notches 11 11 having smooth rounded edges. The main body of the pot is surrounded by a heating coil 12 with ends respectively connected by a switch 13, plugged through holes in the table, with two collector rings 14 14 which are fixed to the bottom of the table and on which bear spring contact-fingers 15 15 adapted to be connected with the outlet of a lighting circuit; and a thermometer 16, partially buried in the insulation wrapped about the coil, serves to indicate approximately the temperature of the interior of the pot. Within the dope pot and coaxial therewith is an inner tube 17, of the same height as the pot itself, which near its lower end is preferably provided with openings 18 18 through its walls and at such end is slidingly fitted into the enlarged bore in the top of a spinner sleeve 19, which spinner stands on the bottom of the pot and is centered therein by flaring legs 20 20 and has its walls pierced by two annular series of staggered holes 21 21 with well-rounded edges. The upper end of this inner tube is also enlarged to funnel-shape, its cylindrical part 22 being removable and provided outwardly with spider legs 23 23 which serve to center it within the top of the pot and to which the pot is secured by screws; and within the cylindrical funnel end is mounted a second or upper spinner sleeve 24, centered within the hub of a spider 25 fixed in the funnel end and held in place by set screws 26 26, which is similar to the lower spinner sleeve, except that it is enough smaller to permit it to pass through both the tube and the lower spinner, and has its walls similarly pierced by two annular series of staggered holes 27 27 drilled to coincide with the holes in the lower spinner when the two spinners are telescoped together.

I prefer to use for the cord a considerable number of fine threads rather than fewer threads of larger size, for the reasons, among others, that whenever a thread breaks or gives out, its absence, until it can be replaced, will make no perceptible difference in the size or strength of the cord and a broken or new thread can be restarted by tying its end to one or two adjacent threads and the knot will be so small that it will not be noticeable in the finished cord. Accordingly, as shown, provision is made on the spinning table for sixty spools of thread, and these threads are carried in groups over the top edge of the dope pot, three threads in each of the twenty notches provided, and then each of these groups of three threads is carried through one of twenty holes in the walls both of the lower and upper spinner sleeves. The threads can most readily be threaded through the holes in the spinner sleeves, in starting the process, by removing the inner tube from the pot and taking off and telescoping together the two spinners, and then passing the groups of threads through the holes of both spinners at the same time; after which the smaller upper spinner can be drawn through the tube by any suitable instrument and the parts reassembled.

The arrangement hereinabove described, whereby the threads are drawn from the spools and caused to travel in an annularly disposed series first from the top to the bottom of the pot 9 outside the open-ended tube 17 and then within the tube from the bottom to the top of the pot, has a twofold advantage. It not only extends the travel of the threads in the dope to nearly twice the height of the pot, giving it a travel of nearly thirty-six inches in a pot eighteen inches in height, and so substantially doubles the time in which the threads may soak in the dope, but also, and even more important, the threads as they are drawn through the pot cause the dope to circulate downwardly around and upwardly within the inner tube so that, moving with the threads, it can much more effectively permeate and soften the fibers of the threads than when the threads are merely drawn through a body of the dope.

The stationary former is mounted by any suitable means in fixed position immediately above the top of the pot and in axial alignment therewith. It here consists of a cylindrical block 28, preferably of brass, with annular shoulders at its ends to which are secured an outer cylindrical shell 29, thus forming about the bar an annular chamber in which is placed a heating coil 30 grounded at one end of the bar and connected at the other end to a binding post 31. The bar has an axial bore 32 into the enlarged and threaded lower end of which is screwed a short guide nozzle 33, which centers the twisted mass of doped threads as they leave the dope pot of the spinning mechanism, and its upper end is similarly fitted with a finishing nozzle 34 the orifice through which is of a diameter to scrape back all excess of the dope solution leaving enough for a smooth finished surface and to give to the cord a smooth cylindrical form. The central bore of the bar is connected near its upper end by a passage 35 with a side bore 36 which extends through the bar but is closed at its upper end by a screw plug and which forms a passage through which the excess of dope scraped back by the upper nozzle can run down into the dope pot. In a second eccentric bore 37, which extends well down but not entirely through the bar there is set a thermometer 38 by which to gauge the temperature to which the bar is to be heated. This part of the apparatus is completed by a glass tube 39 which is tightly fitted to the upper end of the finishing nozzle, as by means of a rubber gasket, and which contains the waterproofing formaldehyde solution through which the cord is passed.

From the spinning and forming mechanism the cord is carried upwardly for some distance and over a large sheave 40, and thence downwardly and into the chamber or box 41 of the drying, stretching and kneading apparatus, over a guide sheave 42 mounted on the top of the chamber.

This drying chamber, as more particularly shown in Figs. 5 and 6, is equipped with several electric heating elements 43, which are connected with a lighting or other suitable circuit and are controlled by switches 44, and with a stack 45 for the escape of the heated air; and within the chamber are mounted two pairs of grooved drums 46 47 and 48 49 the axles of which are journaled at one end in and extend through bearings in the wall of the chamber, the rear wall as shown, and at their other end are journaled in bearings in a hanger 50 and standard 51 secured respectively to the top and bottom wall of the chamber and braced by connecting bars 52. The annular grooves 46$^a$ 47$^a$ with which the first pair of drums are provided, some twenty more or less in each drum, are preferably staggered so that the grooves of the upper drum are positioned midway between and a half space in advance of those of the lower drum, while the grooves 48$^a$ 49$^a$ of the second pair of drums, which are set forward on their axles to bring the first groove of drum 48 in line with the last groove of drum 46, are about forty in number each and are similarly staggered but with the grooves of the lower in advance of those of the upper drum. The two drums of each pair of drums are respectively geared together (see Fig. 7) by gears 53 54 and 55 56, fixed to their respective axle ends outside the wall of the chamber, and all four drums are driven by a pinion 57 which is in mesh with gears 54 and 56 and is fixed to a grooved belt-pulley 58, which belt-pulley, suitably mounted on the outer casing wall, is in turn driven through a belt 59 from another pulley (not shown) by any suitable source of power—for example, the same motor which drives the revolving table of the spinning mechanism. Thus, as shown, the four drums will be driven, the two upper drums in one and the two lower drums in the opposite direction, at the same angular speed, but the second pair of drums 48 49 will have a higher peripheral speed because of their greater diameter.

The cord is carried from the guide-sheave 42 down through a suitable opening in the top of the drying chamber and is passed first from the outside down and around the lower roll 47, in the first or in some intermediate groove 47$^a$, thence upwardly and outwardly and from the outer side over and around the upper drum 46, in the first or in a corresponding intermediate groove 46$^a$, and then down and again around the lower roll in the second or next groove 47$^a$, and up and again around the upper drum, in the second or next groove 46$^a$, and so on until all the grooves have been filled, the cord describing at each full turn around the two drums a complete figure eight. From the last groove of the upper drum 47, the cord is carried across to the upper drum 48 and passed partially around the outer side thereof, in the first of its grooves 48$^a$, thence down and from its inner side around the lower drum 49, in the first of its grooves 49$^a$, and then up and again around the upper drum and back down and again around the lower drum, and so on as in the case of the first pair of drums, until all of the grooves have been filled, the cord again describing a complete figure eight for each full turn around the two drums. And from the last groove of the lower drum the cord is carried down through an opening in the bottom of the chamber and around a guide-sheave 60.

For the fabrication of tennis racket cords from silk threads, I have found that most satisfactory results can be obtained by making the first pair of drums 46 47 of a diameter and so gearing them up as to give them a peripheral speed of approximately five feet per minute, and by so driving the table of the spinning mechanism that the threads will be twisted into spirals with a pitch of three turns more or less per inch. The speed both of the drums and of the spinning table may, however, be varied as desired. The threads of the cord, as it is drawn by the revolving drums from the spinning mechanism and through the former, will, owing to the drag thereon as they pass down and then up through the dope pot on the spinning table and thence through the former, be under a moderate tension of say eight to ten pounds during the passage of the cord upwardly over the sheave 40 and thence downwardly to the drums, and this tension will give a preliminary stretch to the fibres of the threads while the cord is being superficially dried to a certain extent by exposure to the atmosphere during the course of its travel from the former to the drums. The tension thus produced remains about the same while the cord is traversing the grooves of the first pair of drums, and as it weaves up and down and around in the grooves of these drums its surface is gently kneaded in such a manner that its body is packed down and its surface, which is a little rough on entering the drying chamber, is rendered quite smooth. The cord is further and more fully stretched during its passage from the upper drum 46 to the upper drum 48 under the tension to which it is put by the greater peripheral speed of the latter drum—preferably a tension of approximately forty pounds, which can be obtained by making the second pair of drums of a diameter approximately eight per cent. greater than the diameter of the first pair, or, alternatively, by using drums of the same size and driving the second pair at a correspondingly greater angular speed—which tension is substantially maintained as the cord weaves up and down and around in the grooves of these last drums and is further kneaded to thereby pack its body into a very compact hard mass while at the same time giving to its surface a complete and perfect polish. The temperature at which the interior of the chamber is maintained, preferably about 120° F., has a very powerful drying and hardening effect on the cord, so that when it finally emerges from the chamber very little solvent is left in the dope filling and covering and the cord has been worked down to nearly its finished size which, in the case of a racket string, is just under one-sixteenth inch in diameter.

On finally leaving the drums within the drying chamber, the cord is drawn by the reeling mechanism, under tension, from the guide-sheave 60 upwardly to and over a guide-sheave 72, and in the course of its upper travel is carried (see Figs. 1 and 5) first through the pot C to receive its lacquer finish and then through the finish lubricating device D, if both or either of these steps are employed in the fabrication of the cord.

The pot C, which contains the dope heretofore described as used for lacquer finishing the cord, is provided with an opening, with a removable cap 61, through which to fill it and with lower and upper nozzles 62 and 63 through which the cord passes, the bore of the upper nozzle being of a diameter to allow the cord to pass freely and at the same time to scrape off any excess of dope which otherwise might adhere thereto. The pot is shown as fixed to the outer wall of the drying chamber; but if the dope used for the finish lacquer coat has to be heated, as in the case of the gelatine solution hereinabove described, the pot can be equipped with an electric heating coil similar to that used to heat the pot and former of the spinning mechanism or, if found desirable, can be mounted within the drying chamber.

The finish lubricating device is located within the stack 45 of the drying chamber, some five feet or so above the pot C, the arrangement permitting the finish lacquer coating to dry sufficiently during the travel of the cord while the heated air passing up through the stack will maintain the lubricating solution at the temperature required for its use. The device consists of a pot 64 which depends from and is detachably secured, as by spring catches 65, to a shelf cover or top 66, which top is fixed to a wall of the stack immediately beneath a guide-sheave 67, carries a second guide-sheave 68 on a hanger attached somewhat obliquely to its under side, and is provided with suitable inlet and outlet openings 69 and 70 and with a pair of brushes 71 adjacent the latter opening. The cord after leaving the pot C passes up through an opening in the bottom of the offset stack, then over the guide-sheave 67 and down through the inlet opening 69 in the shelf top around the guide-sheave 68, which when the apparatus is in operation will be submerged in the lubricating solution, and thence up between the brushes 71 and out through the outlet opening 70 in the shelf top. The pot will be temporarily detached when the cord is first passed through the device and for refilling when required. A door (not shown) is provided in the side of the stack opposite the device to give access thereto.

The reel 73 upon which the now completely fabricated cord is wrapped is, preferably as hereinabove stated and as shown (Figs. 1 and 9), a wooden cylinder approximately four feet in length and of fourteen inches diameter, this diameter being selected since ten wrappings of the cord thereon will give the measure of the usual unit length of cord for tennis rackets. The reel is removably mounted in a suitable frame 74 upon centering pins 75 and 76, to receive which suitable axial bores are provided in the two heads of the reel. The pin 75 together with one or more eccentric pins 75ª, which are carried by a disk 77 on the end of a shaft 78 journaled in bearings at the end of the reel frame, provide a detachable driving coupling between such shaft and the reel. The second pin 76 is carried by a rod 79 which is mounted to slide axially within a bearing support on the end of the reel frame and may be withdrawn against the action of a coiled spring 80, to release the reel, by pressing outwardly the hand-lever 81. The shaft 78 carries a belt pulley 82 which is driven by belt 83 from a second belt pulley 84 on a shaft 85, which shaft in turn is driven by a sprocket 86 and chain 87 from a second sprocket 88 fixed to the axle of the grooved drum 48 (see Fig. 7). An idler pulley 89, mounted upon a long bracket arm 90 which is hinged at 91 to the reel frame and carries an adjustable weight 92 on its free end, bears on the top of the belt 83 and serves as a tightener therefor. With no weight on the arm, the belt will slip and the reel is not driven; and by suitably varying the size and/or position of the weight the reel can be driven at the speed required to wrap the cord thereon under the desired tension, preferably a tension of from about twenty-five to thirty pounds. The cord is guided to the reel over a guide-sheave 93 which has a threaded bore and is mounted to rotate upon a correspondingly threaded rod 94 removably supported against rotation, as by squared ends 95 95 set into slots in the ends of arms 96 96 on the reel frame. Hence, as it is rotated by the cord, the guide-sheave will travel axially along the rod from one end of the reel to the other, and, by making the sheave of the same diameter as the reel and giving to the threaded bore of the sheave and the rod a pitch of sixteen threads per inch the cord will be wrapped evenly upon the reel with sixteen wrappings per inch, thus leaving a slight space between adjacent wrappings which will permit a free circulation of the air around the cord. As each reel is filled with cord it will be removed from the frame and replaced by another reel, and the rod 94 will be shifted about end for end in its supports to bring the guide-sheave back into starting position for laying the cord on the new reel. The cord is to be kept wrapped on the reel under tension, its ends being tacked or otherwise secured thereto, for at least the few days necessary to permit the thorough hardening of the dope filling and coating, and, preferably, until the cord is to be permanently strung.

In starting operations, a waste of cord can be avoided by tying a cheap cotton lead cord to the mass of silk threads, after they have been threaded as described from the spools into and through the dope pot on the spinning table and thence up through the nozzles of the stationary former, and then carrying this lead cord through the remaining parts of the apparatus and attaching its end by a tack to the reel. As, however, the lead cord will not take the stretch encountered if passed directly from the first to the second pair of drums in the drying chamber, it should be left with a considerable slack at this point and the slack temporarily taken up by hanging on the cord a weighted idler pulley. The dope-pot of the spinning mechanism is then filled and the apparatus is started. When the end of the new silk cord reaches the finish lacquer pot, if used, it will be necessary to stop the apparatus temporarily, untie the lead cord and carry the end of the silk cord through the nozzles of this pot and thence up and through the finish lubricating device, and then again tie on the lead cord and restart the apparatus after having filled the finish lacquer pot and reattached in place the finish lubricating pot which had been removed. When the end of the newly made cord reaches the reel it is tacked to the reel, the lead cord being finally removed therefrom. The slack allowed in the lead cord between the two pairs of drums, usually several feet, can readily be calculated so that it will all be taken up by the time the end of the new cord has passed a turn or two around the second pair of drums, whereupon the idler pulley can be removed without stopping the apparatus.

In the modified spinning and forming mechanism illustrated in Figs. 10–13 of the drawings, designed more particularly for use with a nitrocellulose or other dope which is usable at ordinary atmospheric temperatures, there are two spinning tables—one for forming the core of the cord and a second for applying thereto an oppositely twisted wrapper—and the elongated tubular body of the stationary former associated with each table is equipped with the pumping mechanism, heretofore referred to, whereby the dope with which these tubes are filled can be forced under pressure upwardly therein at a speed substantially the same as that at which the threads of the cord are drawn therethrough.

The core-forming table 101 rotates, as before, upon a vertical axle stepped into its hub. It is driven by a crossed belt 102, passed over guide-sheaves 103 and 104 located somewhat back from the table, from one of the grooves of a double-grooved pulley 105 fixed to the rear end of a pump shaft 117, which shaft is, or may be, in turn driven through a suitable connection (not shown) with a small electric motor. This table carries say thirty spools 106 106 of the sixty threads which are preferably used in the making of a cord, which spools are here mounted in pairs, one above the other, upon vertical posts or spindles 107 107 evenly spaced apart in a circle near the periphery of the table. The table also carries, mounted axially thereon to rotate therewith, the dope pot 108, which is here mounted four or five inches above the table upon a short post 109 fixed in the hub of the table; and the threads $a'$ $a'$ are carried from each pair of spools through guides 110 111 respectively and thence together around one of a series of circularly disposed guide-sheaves 112 112 mounted on the table and into the dope pot through one of the circularly disposed series of holes $108^x$ drilled somewhat at an incline through the bottom of the pot, such holes being of a size to permit the passage of the silk threads and any knots which may be tied therein while not large enough to allow the gummy dope solution to run out therethrough.

The stationary former with its elongated pipes, channel, nozzles, pump equipment, feed and return pipes, etc., forms a complete mechanical unit. A cast pump body 113 with detachable cover 114, of acid-resisting bronze, provide a chamber in which are housed the two pump gears 115 and 116, of ground case-hardened steel. The shaft 117 of gear 115 extends at one end out through its bearing in the cover and carries the drive pulley 105 and, as hereinabove stated, is in turn driven by suitable connections from any appropriate source of power. The bearings of the shaft 118 of gear 116 in the pump body and cover are entirely closed. The pump body has a central channel 119, forming a part of the former tube, which at a point opposite the pump gears is closed by a nozzle 120, with axial bore just large enough to permit the twisted core of the cord to readily pass therethrough, and is connected with the gear chamber above and below the gears by a suction opening 121 and discharge opening 122. Into the lower end of the pump body are set a pipe 123, which extends the suction end of the channel 119 downwardly into the upper end of the revolving dope pot 108, and, concentric therewith, a larger pipe 124 which also extends down into the upper end of the dope pot and provides an annular channel around the inner pipe through which to fill the pot and to return to the pot the dope pumped therefrom through the former. The discharge end of the channel 119 is extended upwards by a pipe 125 which is respectively fixed by cast flanges 126 and 127 at its lower end to the pump body and at its upper end to a nozzle casting 128. This casting has a vertical channel 129 which provides an extension of the pipe 125 and is closed at its upper end by a nozzle 130, with axial bore of a size to permit the passage of the twisted core of the cord but to scrape back any excess of dope adhering thereto; and immediately below the nozzle this passage branches off into an elbow passage 131 which carries a pressure gauge 132 and is connected through an elbow provided with a choke-valve 133 and a return pipe 134 with one side of the annular channel formed between the pipes 123 and 124. The other side of the channel is connected through pipe connections 135 and a shutoff valve 136 to a small hand-driven gear pump 137 which is fed with dope from a dope-supply tank 138.

The wrapper spinning and forming mechanism is in most respects a duplication of the core spinning and forming mechanism described. The table 101ª, rotating upon its vertical axle, is driven from the second groove of the belt pulley 105 over guide-sheaves 103ª and 104ª by a direct belt 102ª. An axial bore 139, however, extends up through the axle and hub of the table and thence through the post 109ª and the bottom of the dope-pot 108ª through which to pass the previously formed core of the cord; and the table will usually carry spools 106ª for the remaining half of the sixty threads a', of the complete cord. The pump of the former unit associated with this second table is driven by a belt 140 passing over belt pulleys 141 and 142 fixed respectively to the gear-shaft 117 and to the correspondng shaft 117ª, of pump gear 115ª, and one side of the annular channel formed within the pipe 124ª is connected through pipe connections 135ª and a shutoff valve 136ª with the hand-driven gear-pump 137.

Before starting the apparatus the threads on the core-forming table, after being threaded through the openings in the bottom of its dope-pot, are hooked up through the tubular passage and nozzles of the former, and thence are carried upwards and over an upper sheave (not shown), then down and around guide-sheaves 143 and 144 and up again through the axial bore 139 into the dope-pot 108ª of the wrapper-forming table, whence, together with the threads on this table which have been threaded through the openings in the bottom of the dope-pot, both core and wrapper threads are hooked up through the tubular passage and nozzles of the second former and are tied to the end of a lead cord which, as before, is carried over sheave 40 (Fig. 1) and thence through the remainder of the apparatus. The dope-pots on the two tables are now filled, and later replenished, with dope by opening the shutoff valves and giving a few turns to the hand-pump 137. The apparatus is then started as hereinabove described. As the twisted threads are drawn from the two tables up and through the pipes 123 and 123ª they carry with them from the dope-pots columns of dope which pass into the pump suction openings 121 and 121ª and prime the pumps.

The advantages secured by the pressure-pumping mechanism associated with the forming device are two-fold. By causing the dope to move with the twisted threads through the former passage a long nozzle tube can be used and a high degree of impregnation of the threads with the dope obtained without subjecting the twisted threads to tension from a drag of the dope, and by choking the return pipe the impregnation of the threads is further improved by the pressure thus put upon the dope. Moreover, the friction encountered by the dope in its circulation is considerable, so that it will become well warmed up, say to a temperature in the neighborhood of 110° F., thus rendering it more fluid and improving its action in every respect. Excellent results have been obtained by using former tubes about four feet in length, which at the usual speed of the apparatus allows the threads to remain and soak in the dope for approximately one minute, and by so choking the circulation as to raise the pressure of the dope to about seventy-five pounds. The length of travel of the core between its own spinning and forming mechanism and the wrapper forming table allows its dope filling and coating to harden sufficiently to prevent its being squeezed out by the tension set up by the viscosity of the dope and other elements of friction thereafter encountered.

It will, of course, be understood that the several features, both of the process and of the apparatus, may be variously modified in their several details, and that such features may be differently combined or some thereof omitted entirely, within the scope of the appended claims, without departing from the spirit or sacrificing the substantial advantages of the invention.

What I claim as new, and desire to secure by Letters Patent, is—

1. The process of making filled and coated cord of twisted fibrous threads which comprises as steps therein thoroughly soaking the threads of which the cord is composed to soften the particles of their fibers by causing the threads to travel at a moderate speed in an extended path first downwardly in an outer annulus and then upwardly in an inner annulus within a deep vertical body of a solution of the filling and coating composition and twisting them while immersed therein.

2. The process of making filled and coated cord which comprises as steps therein thoroughly soaking and softening the fibers of the threads of which the cord is composed prior to twisting them by causing them to travel at a moderate speed and in an extended path first downwardly and then upwardly within a deep vertical pot filled with a solution of the filling and coating composition to thereby cause a circulation of the composition in the direction of travel of the threads, twisting the threads, and then passing the twisted threads and adhering composition through a cord-forming device.

3. The process of making filled and coated cord which comprises as steps therein drawing the threads of which the cord is composed through a body of the filling and coating composition in solution, twisting them while immersed in such solution, and causing the twisted threads to travel through an extended path within a body of the solution moving under pressure at substantially the same speed as the moving threads.

4. The continuous process of making filled and coated cord which comprises as steps therein first thoroughly soaking and then twisting the threads of the cord in a solution of a wear-resistant filling and coating composition, forming and partially drying the cord under tension, and while still under tension and while the filling and coating composition is hardening both causing the cord to repeatedly bend alternately first in one direction and then in the opposite direction to further stretch the fibers of the threads and compacting the composition in and around the threads.

5. Apparatus for making filled and coated cord comprising as elements thereof a rotatably mounted member carrying a plurality of spools of threads and, mounted centrally thereof to rotate therewith, a deep upright pot adapted to contain a solution of the filling and coating composition and equipped with means by which the threads drawn from the spools are carried first downwardly in an outer annulus within and near the outer shell of the pot substantially to the bottom thereof and then in an inner annulus upwardly and out of the pot near the central axis thereof.

6. Apparatus for making filled and coated cord comprising as elements thereof a rotatably mounted member carrying a plurality of spools of threads and, mounted centrally thereof to rotate therewith, a deep upright pot adapted to contain a solution of the filling and coating composition and carrying an inner member extending coaxially from the top to close to the bottom of the pot to permit the free upward and downward circulation of the composition therein by which the threads drawn from the spools are caused to travel first downwardly within and near the outer shell of the pot and then upwardly near the central axis thereof.

7. Apparatus for making filled and coated cord comprising as elements thereof a rotatably mounted member carrying a plurality of spools of thread and, mounted centrally thereof to rotate therewith, a deep upright pot adapted to contain a solution of a gelatin composition and carrying means by which the threads drawn from the spools are caused to travel first downwardly in an outer annulus substantially to the bottom and then upwardly in an inner annulus to the top of the pot to thereby give them an extended travel and allow them to thoroughly soak in the solution, a heating element surrounding the pot, and stationary forming means through which the twisted threads and adhering composition are passed upon leaving the pot.

8. Apparatus for making filled and coated cords comprising rotatably mounted means carrying a plurality of spools of thread and, mounted coaxially thereof, an upright pot containing a solution of the filling and coating composition and having an inner open-ended tube extending from close to the bottom to the top thereof, into and through which the threads are drawn from the spools first downwardly outside of and then upwardly within the inner tube thereby causing a circulation of the solution in the direction of movement of the threads.

9. Apparatus for making filled and coated cord which comprises a spinning table carrying a plurality of spools of thread, a pot containing a solution of the coating and filling composition mounted coaxially of the table to rotate therewith and into and through which the threads are carried from the spools and, associated therewith, a forming device providing an extended tubular passage terminating in a nozzle through which the twisted threads are carried on leaving the pot on the spinning table and means for causing a circulation of a solution of filling and coating composition with which said tubular passage is filled through said passage in the same direction and substantially at the same speed of travel as the threads.

10. In apparatus for continuously making filled and coated cord, the combination of means for thoroughly soaking and then twisting a plurality of fibrous threads in a solution of a wear-resistant composition and for forming the body of the cord, means for partially drying the cord so formed under tension, and means for simultaneously stretching the fibers of the threads and for compacting the body of the cord while the filling and coating composition is hardening including a plurality of grooved rolls over which the cord is carried under tension to thereby cause it to be bent alternately first in one and then in the opposite direction.

11. The process of making a dope filled and coated cord which comprises soaking thoroughly and twisting a plurality of fibrous threads in a solution of the dope, partially drying the cord under tension and while so drying kneading it to compact the fibres of its threads and the dope and to round and smooth its body, further drying the cord under additional tension and while so drying re-kneading it for a protracted period of time to further compact the fibres of its threads and the dope and to round and smooth its body, and finally reeling up and maintaining the cord under tension until the dope filling and coating has thoroughly hardened.

12. In apparatus for continuously making a dope filled and coated cord, the combination of means for soaking and twisting a plurality of fibrous threads in a solution of the dope and forming the body of the cord, means including two pairs of grooved rolls for drawing the cord through and from the spinning and forming means and preliminarily compacting and smoothing its body under tension and for then further and thoroughly compacting and smoothing its body under increased tension during a protracted period of time while drying, and means for reeling up under tension the stretched, compacted and smoothed cord.

13. In apparatus for making a dope filled and coated cord, means for stretching and kneading the cord under tension while the dope is drying comprising two pairs of grooved drums which are driven one drum of each pair in one direction and the other drum of each pair in the opposite direction and the second pair of drums at a somewhat higher peripheral speed than the first pair and around and within the grooves of which the cord is passed first a plurality of times about the first pair of drums in manner to form a figure eight on each turn around both drums and then carried to and passed a plurality of times around the second pair of drums in a similar manner.

14. In apparatus for making a dope filled and coated cord, means for drying, stretching and kneading the freshly filled and coated cord comprising a chamber, means for heating the chamber, and mounted within the chamber two pairs of drums which are spaced apart, each drum of a pair and each pair of drums from the other, and are provided with a plurality of V-sectioned grooves with rounded bottoms, and means for driving the drums of each pair in opposite directions and the second pair of drums at a somewhat higher peripheral speed than the first pair.

15. In apparatus for making dope filled and coated cord, means for drying, stretching and kneading the cord comprising two pairs of drums which are spaced apart each drum of a pair and each pair of drums from the other and are provided each with a plurality of V-sectioned grooves with rounded bottoms, the grooves of each pair of drums being staggered so that the grooves of one will be intermediate the grooves of the other, means for driving the drums of each pair in opposite directions and the second pair of drums at a somewhat higher peripheral speed than the first pair, and means for heating the cord while passing around the drums.

16. The continuous process of making a filled and coated cord which comprises soaking and twisting the threads of the cord in a solution of a wear-resisting composition, partially drying the cord, further drying the cord and while so drying stretching and mechanically kneading it under tension and then further stretching and kneading it under increased tension for a protracted period of time to thoroughly remove the looseness of the fibres of the threads and compact and smooth its body, and reeling the cord up in spaced spirals under tension and so maintaining it under tension until the filling and coating composition has thoroughly hardened.

17. The process of making a dope filled and coated cord which comprises soaking and spinning the threads in a solution of the dope and causing the twisted threads to travel through a somewhat extended path with a solution of the dope under pressure, drying the cord and while drying, stretching and compacting it, and reeling up the cord and maintaining it under tension until the dope filling and coating has thoroughly dried.

18. In apparatus for making a dope filled and coated cord, the combination of twisting and forming mechanism comprising means for carrying the threads through and twisting them in a solution of the dope, drying, stretching and kneading mechanism comprising two pairs of grooved drums driving the drums of each pair in opposite directions and the second pair at greater peripheral speed than the first pair, and reeling mechanism.

19. A composite cord of the character described comprising a plurality of twisted and thoroughly stretched fibrous threads and a compacted and hardened wear-resistant composition filling and coating both the individual and the body of twisted and stretched threads.

20. A composite cord of the character described comprising a plurality of twisted and thoroughly stretched silk threads and a gelatin composition permeating the fibres of the threads and compacted and hardened within, between, and surrounding the twisted and stretched threads.

EDSON F. GALLAUDET.